United States Patent [19]

Jorde et al.

[11] Patent Number: 5,072,659
[45] Date of Patent: Dec. 17, 1991

[54] HEATED DOOR

[76] Inventors: Michael J. Jorde, 909 S. 8th St., Box 237, Cando, Inc. 58324; Mark A. Brehm, P.O. Box 237, Churchs Ferry, N. Dak. 58325

[21] Appl. No.: 552,736

[22] Filed: Jul. 11, 1990

[51] Int. Cl.⁵ .......................... E04H 7/22; F24F 13/10
[52] U.S. Cl. ..................................... 454/174; 454/271
[58] Field of Search ...................... 98/118, 52, 54, 87, 98/51; 219/465, 471

[56] References Cited

U.S. PATENT DOCUMENTS

| | | | |
|---|---|---|---|
| 2,493,125 | 1/1950 | Foster | 219/34 |
| 2,795,683 | 6/1957 | Teiger | 219/34 |
| 3,952,542 | 4/1976 | Berkowitz | 98/87 |
| 4,163,144 | 7/1979 | Reyaler | 219/368 |
| 4,372,197 | 2/1983 | Augsburger | 98/118 |
| 4,662,270 | 5/1987 | Fiddler et al. | 98/87 |

FOREIGN PATENT DOCUMENTS

| | | | |
|---|---|---|---|
| 3301944 | 7/1984 | Fed. Rep. of Germany | 98/87 |
| 3802583 | 8/1989 | Fed. Rep. of Germany | 98/87 |
| 0136328 | 7/1979 | German Democratic Rep. | 98/52 |
| 0132849 | 10/1979 | Japan | 98/52 |

*Primary Examiner*—Albert J. Makay
*Assistant Examiner*—William C. Doerrler
*Attorney, Agent, or Firm*—Zarley, McKee, Thomte, Voorhees & Sease

[57] ABSTRACT

A heated ventilation door for a potato storage facility or the like is described comprising a door pivotally mounted in a support mounted in an opening formed in one wall of the storage facility. The door includes a hollow peripheral frame having heating fluid contained therein which is heated by an electrical heating element in communication therewith. The heating element is controlled by a thermostat to conserve energy and is also controlled by a mercury switch which deactivates the heating element when the door is in its open position. When the door is in its closed position, the heating element heats the heating fluid in the peripheral frame at the location of the heating element in the peripheral frame causing the heating fluid to circulate around the peripheral frame.

9 Claims, 6 Drawing Sheets

HEATED DOOR

BACKGROUND OF THE INVENTION

This invention relates to a heated door, and more particularly the heated ventilation door for a potato storage facility.

Perhaps one of the most difficult challenges a potato grower faces is the management of potato storage. Storage temperature, in the majority of cold weather storages, is manually adjusted and maintained by a series of air mixing doors or louvers that are opened or closed with ropes and pulleys. Unless a 24-hour vigil is held, even the most diligent storage manager cannot maintain a constant air plenum temperature. Repeated temperature fluctuations of as little as two degrees can diminish the quality of the potato. Storage management is further complicated when the manager must manually cool or warm the product at a constant rate over a specific period of time.

Systems have been provided for automatically controlling the operation of the ventilation doors in storage facilities but they are extremely complex and are difficult to maintain. Further, in cold weather climates, the ventilation doors tend to freeze due to the moisture associated with the materials being stored. If the ventilation door freezes, control of the storage temperature within the storage facility is virtually impossible.

It is therefore a principal object of the invention to provide a heated door for a storage facility.

Still another object of the invention is to provide a heated ventilation door for a storage facility which includes a thermostatically-controlled heating unit designed to conserve energy by eliminating excessive fluid heating.

Still another object of the invention is to provide a heated ventilation door for a storage facility which is de-energized when the door is in its open condition.

Still another object of the invention is to provide a heated ventilation door for a storage facility which is easy to install and which requires very little maintenance.

Yet another object of the invention is to provide a heated ventilation door for a storage facility which is economical of manufacture, durable and refined in appearance.

These and other objects of the present invention will be apparent to those skilled in the art.

SUMMARY OF THE INVENTION

Figure 1:
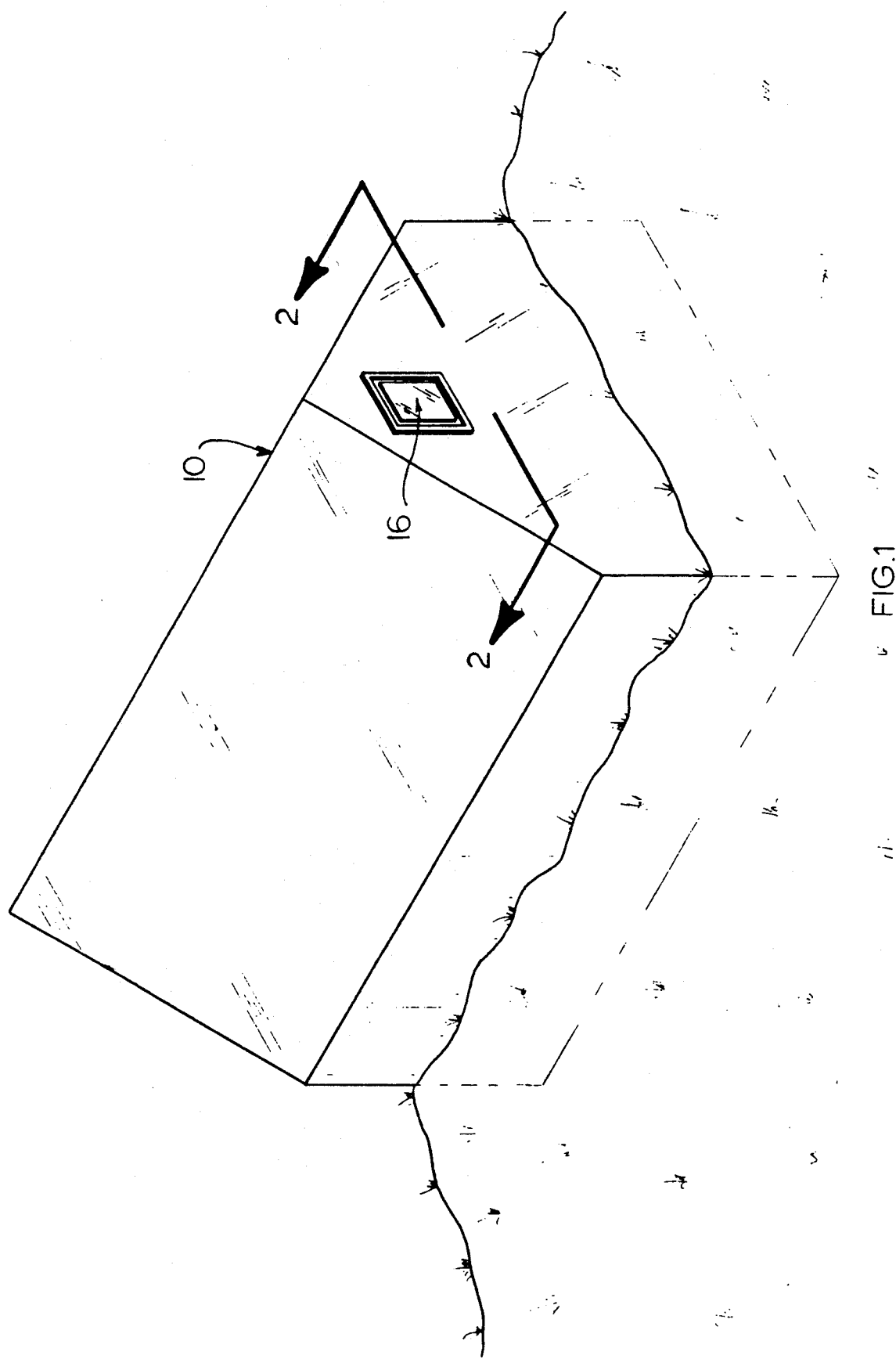
FIG. 1 is perspective view of a potato storage facility having the heated ventilation door of this invention mounted therein.
Figure 2:
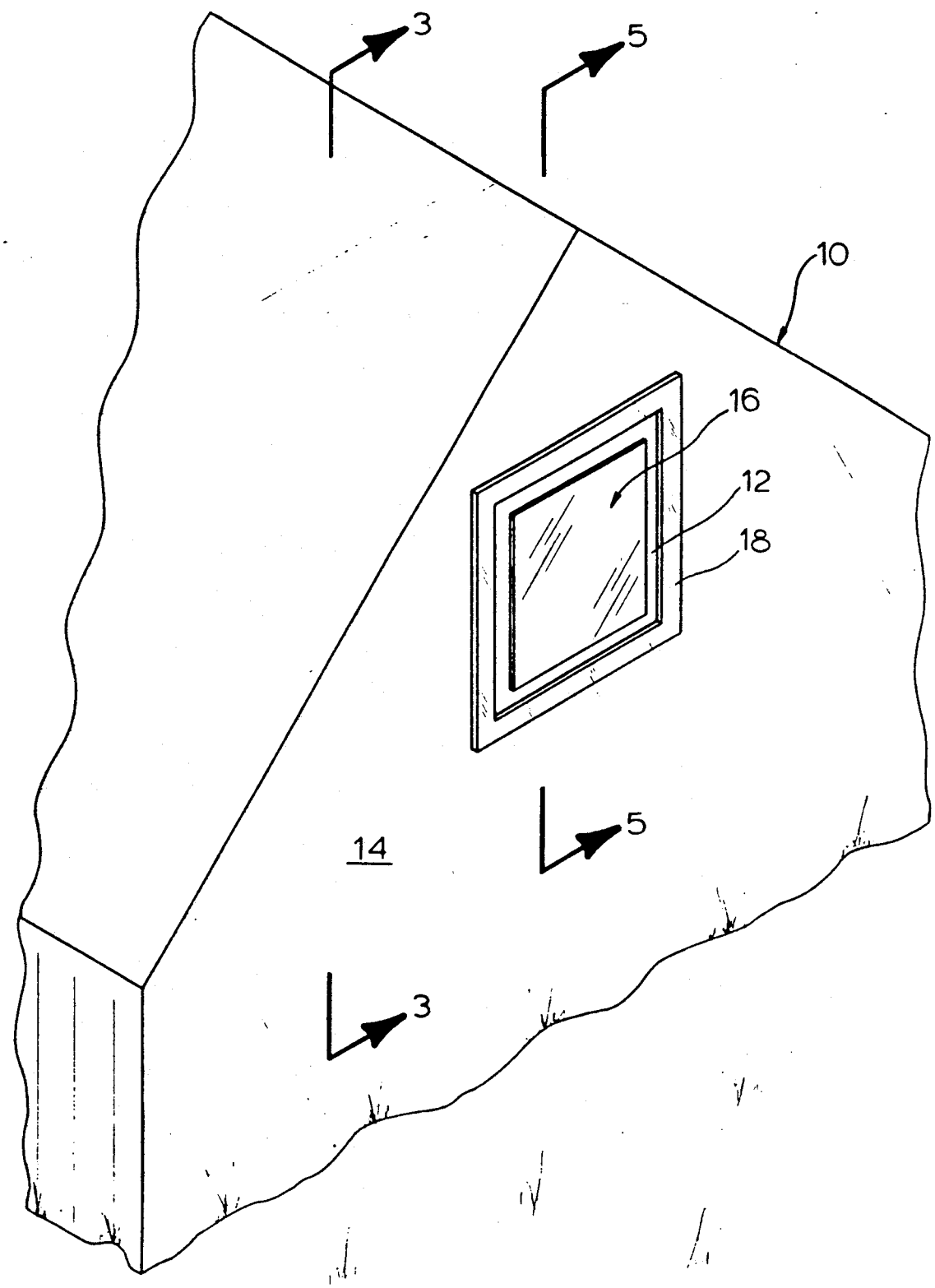
FIG. 2 is a partial perspective view similar to FIG. 1.
Figure 3:
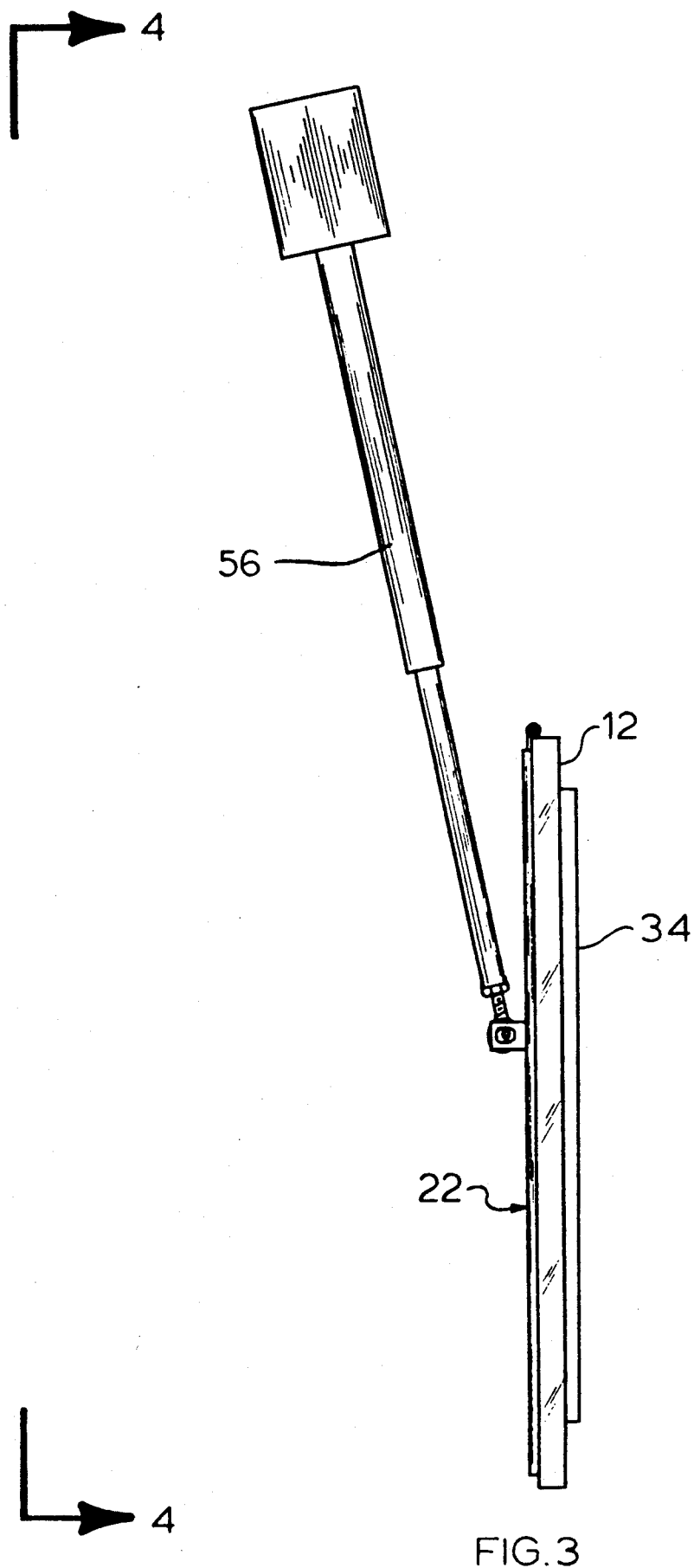
FIG. 3 is a side view of the heated ventilation door as seen on lines 3—3 of FIG. 2.

The heated ventilation door of this invention is mounted in an opening in a storage facility which requires ventilation so that the product being stored therein will be maintained at the proper temperature. The heated door of this invention comprises a support which is mounted in the opening and which has a door pivotally mounted therein and which is movable between closed and open positions. A screw actuator is operatively connected to the door to enable the door to be moved between its open and closed position. The door includes hollow peripheral frame means which has heating fluid contained therein. A heating element is in communication with the fluid in the frame and heats the fluid therein to prevent the door from freezing in cold temperatures. A thermostat is also in communication with the fluid in the frame to prevent overheating of the fluid so as to conserve energy. Further, the thermostat is deactivated when the door is in its open condition since there is no need to heat the door during the time that the door is open.

DESCRIPTION OF THE PREFERRED EMBODIMENT

Numeral 10 refers to a conventional storage facility for potatoes or the like. If the facility 10 is being used to store potatoes, a large portion of the facility 10 will normally be located beneath the ground. Facility 10 is provided with an opening 12 in an end wall 14 into which the heated door of this invention is mounted and which is referred to generally by the reference numeral 16. The door 16 may be located in any of the walls of the storage facility as desired.

Figure 4:
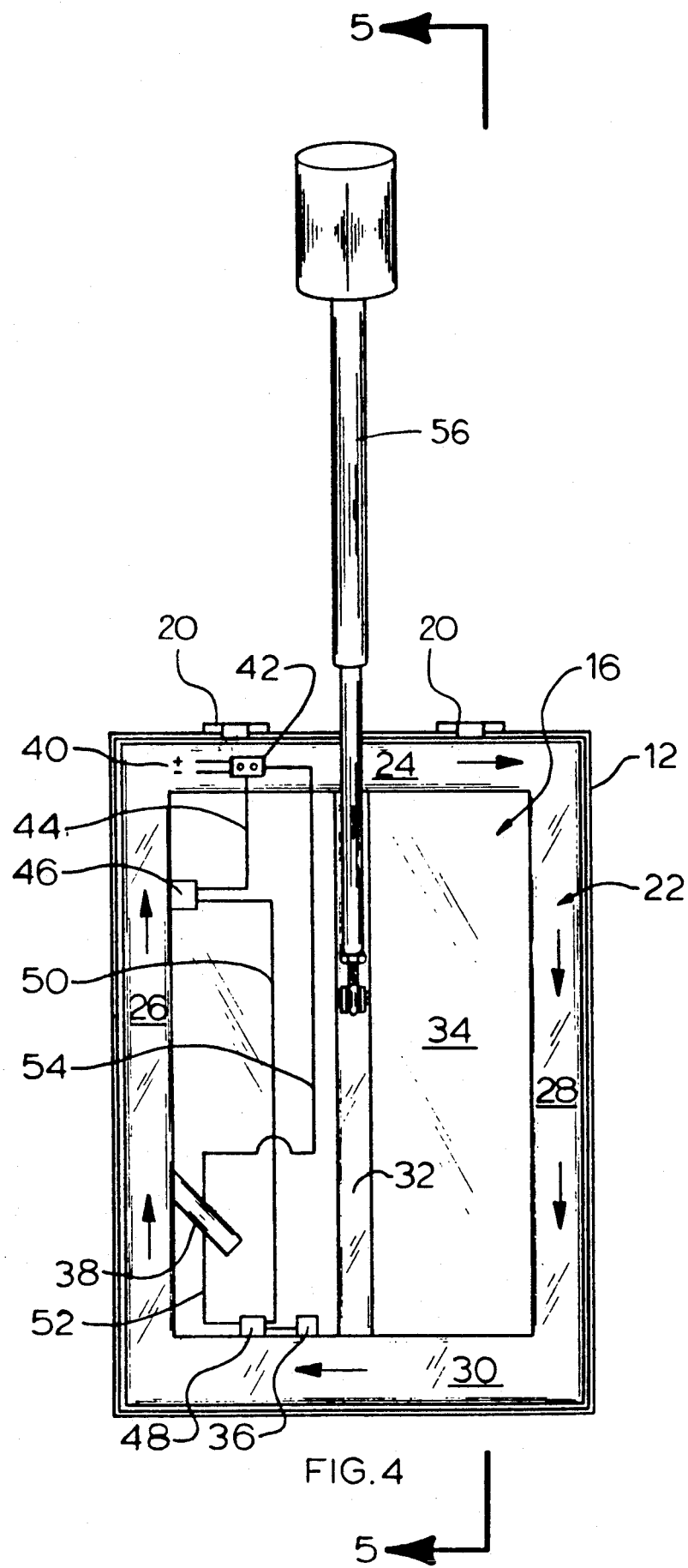
FIG. 4 is a view of the ventilation door of this invention as seen on lines 4—4 of FIG. 3.
Figure 5:
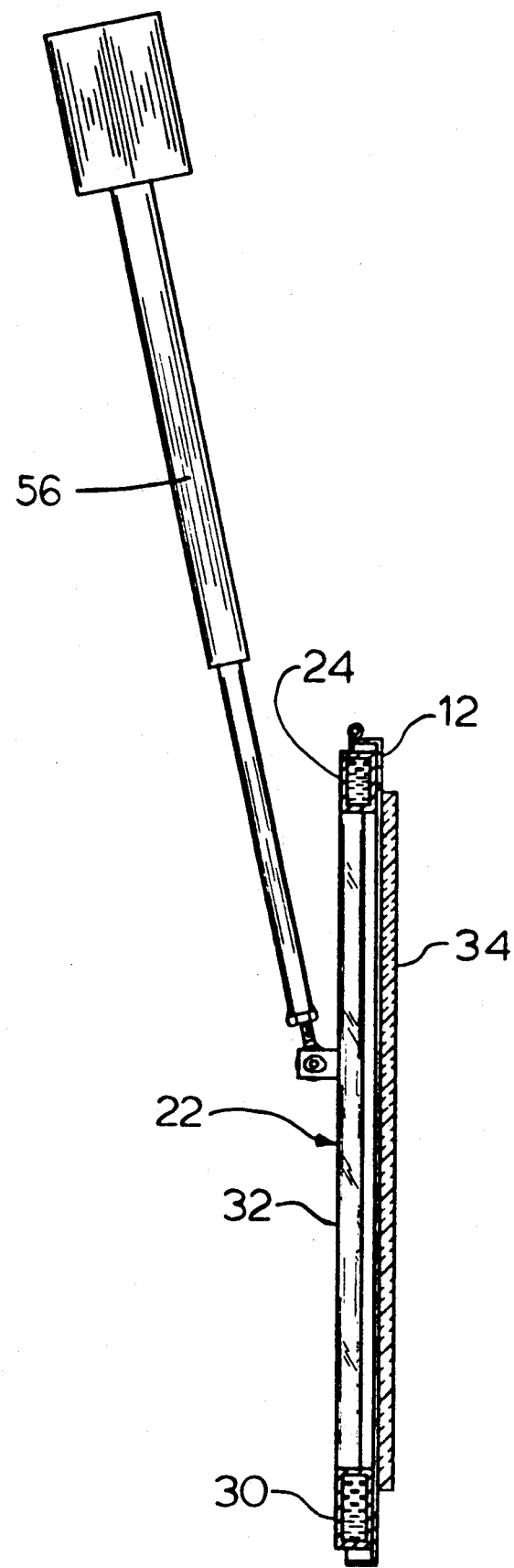
FIG. 5 is a sectional view as seen on lines 5—5 of FIG. 4.
Figure 6:
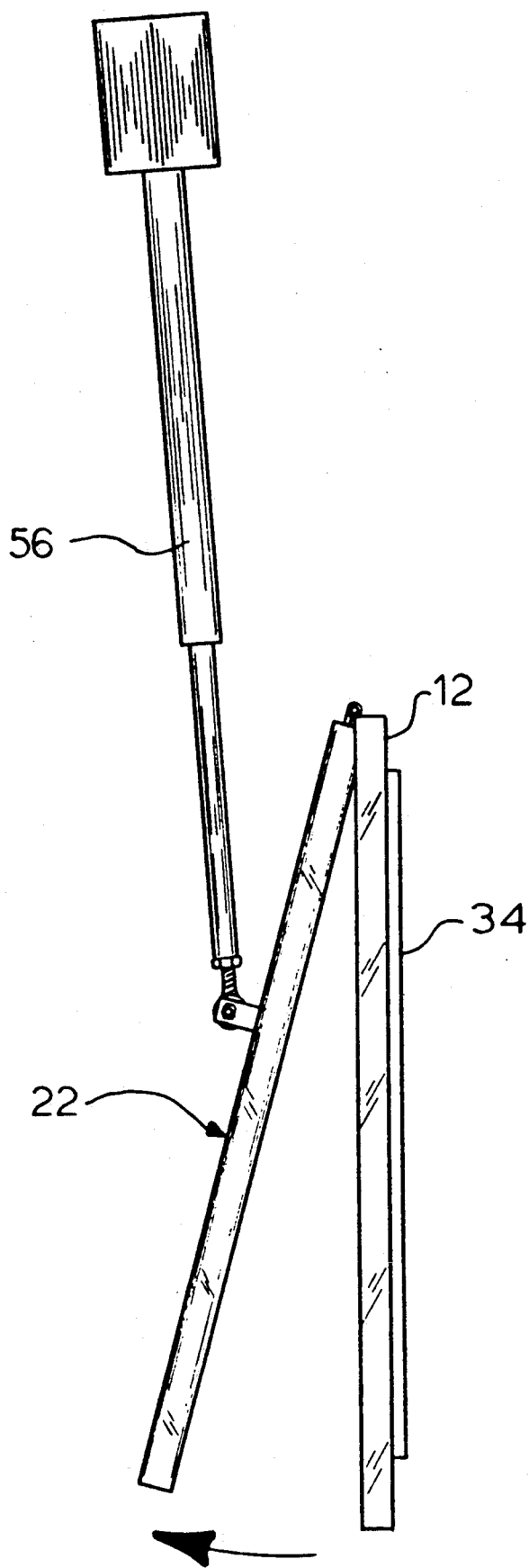
FIG. 6 is a view similar to FIG. 3 except that the door has been partially moved towards its open position.

A generally rectangular frame 18 is mounted in the opening 12 and has the door 16 pivotally connected thereto at 20. Door 16 includes a peripheral tubular frame 22 including an upper frame member 24, opposite side frame members 26 and 28, and bottom frame member 30. Brace 32 is secured to the frame members 24 and 30 and extends therebetween as seen in the drawings. An insulated door panel 34 is positioned at the outer surface of the door and extends between the frame members as seen in the drawings. Frame members 24, 26, 28 and 30 are hollow and are fluidly interconnected at their junctures. A heating fluid, such as water and antifreeze, is inserted into the frame means 22 through the fill hole 36. Preferably, a 1500 watt water heater element is threadably mounted in the frame member 26 as seen in the drawings and is connected to a suitable source of electrical power to heat the fluid in the tubular frame means 22. The heater is located so as to circulate the heated fluid by convection as shown in FIG. 4. For purposes of description, the source of 110 volts alternating current is referred to generally by the reference numeral 40. An optional electrical receptacle 42 is connected to the source of power 40 as illustrated in the drawings and has a lead 44 extending to a mercury switch 46 mounted on the frame means 22 as seen. Switch 46 is electrically connected to the thermostat 48 by lead 50. Thermostat 48 is also connected to the heating element 38 by lead 52. Heating element 38 is connected to the source of power 40 or the optional receptacle 42 by lead 54.

An electrically-operated screw actuator 56 is pivotally connected to frame member 32 raising and lowering the door between its open and closed positions. The screw actuator 56 is connected to suitable control means so that the door 16 will be opened or closed at the proper times and in the proper amounts.

When the door 16 is in its closed condition or in its substantially closed position, heat will be supplied to the heater 38 to heat the fluid within the frame means 22 so that the door 16 will not freeze in the frame means 14. When the door is moved to its open position by the screw actuator 56, there is no need to heat the door so the mercury switch 46, when the door is in its open position, will deactivate the heater element 38. With the door in its closed position, the thermostat 48 causes the heater element 38 to heat the fluid in the frame means 22 and deactivates the same, when a predetermined temperature has been reached, so as to conserve energy.

Thus it can be seen that a novel ventilation door has been provided for a storage facility which includes a peripheral frame having heating fluid therein so that the door will not freeze in its supporting structure, thereby insuring that the door may be moved to its open position as required during the storage of commodities such as potatoes, etc.

Thus it can be seen that the invention accomplishes at least all of it stated objectives.

We claim:

1. In combination with a building requiring ventilation through an opening in one of the walls thereof, comprising,
    a support means mounted in said opening and having upper and lower ends,
    a door means pivotally mounted in said support means and being movable between closed and open positions,
    means operatively secured to said door means for moving said door means between its said open and closed positions,
    said door means including a hollow tubular, peripheral frame means which is received by said support means,
    a fluid in said tubular frame means,
        said frame means being fluidly sealed to maintain said fluid therein,
    heating means in said tubular frame means for heating said fluid therein for preventing said door means from becoming frozen in said support means,
    and thermostat means for controlling said heating means.

2. The combination of claim 1 wherein said heating means is positioned in said tubular frame means to cause the circulation of said fluid within said tubular frame means by convection.

3. The combination of claim 1 wherein a mercury switch means is mounted on said door means and which is operatively connected to said heating means for deactivating said heating means when said door means is positioned in its said open position.

4. The combination of claim 1 wherein said support means includes a top member, a bottom member, and opposite side members; said frame means comprising a top frame member, a bottom frame member and opposite side frame members; the interiors of said frame members being in fluid communication with each other; said heating means being positioned in one of said side frame members adjacent the lower end thereof.

5. The combination of claim 4 wherein a brace is secured to and extends between said top and bottom frame members; said means for moving said door being secured to said brace.

6. The combination of claim 5 wherein said means for moving comprises an electronically operated length adjustable means.

7. The combination of claim 1 wherein said fluid is a liquid, and wherein a sealable fill hole is provided in one of said frame members to completely fill said hollow tubular member with liquid.

8. The combination of claim 1 wherein said door means has an insulated outer surface.

9. In combination with a building requiring ventilation through an opening in one of the walls thereof, comprising,
    a support means mounted in said opening and having upper and lower ends,
    a door means pivotally mounted in said support means and being movable in closed and opened positions,
    an actuator operatively secured to said door means for moving said door means between its said open and closed positions,
    said door means including a hollow tubular frame means which is received by said support means,
    a fluid in said tubular frame means, said hollow tubular frame means being fluidly sealed to maintain said fluid therein,
    and means for heating the fluid in said tubular frame means.

* * * * *